United States Patent
Schnapp et al.

(10) Patent No.: US 11,904,946 B2
(45) Date of Patent: Feb. 20, 2024

(54) PRESS-HARDENED SHAPED SHEET-METAL PART HAVING DIFFERENT SHEET THICKNESSES AND STRENGTHS

(71) Applicant: Bayerische Motoren Werke Aktiengesellschaft, Munich (DE)

(72) Inventors: Sebastian Schnapp, Munich (DE); Martin Sittenberger, Stoettwang (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 20 days.

(21) Appl. No.: 17/719,471

(22) Filed: Apr. 13, 2022

(65) Prior Publication Data
US 2022/0332372 A1      Oct. 20, 2022

(30) Foreign Application Priority Data

Apr. 14, 2021   (DE) .................. 10 2021 109 306.6
Feb. 23, 2022   (DE) .................. 10 2022 104 206.5

(51) Int. Cl.
B62D 25/04   (2006.01)
B62D 29/00   (2006.01)
B21D 22/26   (2006.01)
C21D 9/00    (2006.01)

(52) U.S. Cl.
CPC ............ B62D 25/04 (2013.01); B21D 22/26 (2013.01); B62D 29/007 (2013.01); C21D 9/0068 (2013.01); *C21D 2221/00* (2013.01)

(58) Field of Classification Search
CPC .... B62D 25/04; B62D 29/007; B21D 22/208; B21D 35/006; B21D 37/16; C21D 9/0068; C21D 2221/00

USPC .............................. 296/193.06, 187.01, 191
See application file for complete search history.

(56) References Cited

U.S. PATENT DOCUMENTS

2011/0233946 A1   9/2011  Pellmann et al.
2014/0008938 A1   1/2014  Busch et al.
2017/0341684 A1   11/2017 Goldyn et al.

FOREIGN PATENT DOCUMENTS

DE   10 2010 012 825 A1   9/2011
DE   10 2015 203 644 A1   9/2016
EP      2 754 603 A1      7/2014

OTHER PUBLICATIONS

German-language Search Report issued in German Application No. 10 2021 109 306.6 dated Dec. 16, 2021 with partial English translation (10 pages).

*Primary Examiner* — Dennis H Pedder
(74) *Attorney, Agent, or Firm* — Crowell & Moring LLP

(57) ABSTRACT

A press-hardened shaped sheet-metal part, in particular a pillar reinforcement for a motor vehicle bodyshell, which has different sheet thicknesses and strengths, with an unhardened first region, or a first region which is hardened only to a small extent, and with a press-hardened second region, wherein the second region has a larger or smaller sheet thickness than the first region. A transition region, which, starting from the first region, has a sheet thickness transition zone, an intermediate zone, and a strength transition zone, is formed between the first region and the second region.

12 Claims, 2 Drawing Sheets

PRESS-HARDENED SHAPED SHEET-METAL PART HAVING DIFFERENT SHEET THICKNESSES AND STRENGTHS

CROSS REFERENCE TO RELATED APPLICATIONS

This application claims priority under 35 U.S.C. § 119 from German Patent Application No. DE 10 2021 109 306.6, filed Apr. 14, 2021, and German Patent Application No. DE 10 2022 104 206.5, filed Feb. 23, 2022, the entire disclosures of which are herein expressly incorporated by reference.

BACKGROUND AND SUMMARY

The invention relates to a press-hardened shaped sheet-metal part having different sheet thicknesses and strengths, the shaped part being in particular a pillar reinforcement for a motor vehicle bodyshell.

DE 10 2015 203 644 A1 discloses a press-hardened shaped sheet-metal part which has different sheet thicknesses and strengths, at least two adjacent regions being provided which are formed with different sheet thicknesses and with different strengths, in such a way that one of these regions is press hardened and the other region is unhardened or is hardened only to a small extent. A transition region, which is configured both as a thickness transition region and as a strength transition region, is formed between these regions.

By contrast, the press-hardened shaped sheet-metal part according to the invention has improved loading and deformation properties and in particular improved crash behavior. The invention also comprises a pillar reinforcement formed according to the invention for a motor vehicle bodyshell. Further features of the invention will become apparent analogously for both subjects of the invention from the dependent patent claims, the following description of the invention, and the drawing. This also applies to features which are described as exemplary and optional. The features disclosed in the description, the patent claims and the drawing may be combined without restriction, in particular also separately from disclosed combinations of features, to form further embodiments of the invention.

The press-hardened shaped sheet-metal part according to the invention (also referred to below simply as shaped sheet-metal part, this being understood to mean a sheet-metal part which is created by deformation and is three-dimensionally shaped or has a three-dimensional shape) has an unhardened first region, or a first region which is hardened only to a small extent, and a press-hardened second region, wherein the second (press-hardened) region has a larger or smaller sheet thickness than the first region. According to the invention, a transition region, which, proceeding from the first region (in the direction of the second region), has or comprises a sheet thickness transition zone, an intermediate zone and a strength transition zone, is formed between the first region and the second region.

The first region and the second region, which are understood to mean in particular surface regions, are preferably adjacent regions (component regions), which are spaced apart from one another only by the transition region. In particular, the entire transition region is located between the first region and the second region. Irrespective of this, the transition region in particular has only the three above-mentioned zones.

The shaped sheet-metal part according to the invention is press hardened at least in the second region. Press hardening is known per se from the prior art, to which end reference is made to corresponding specialist and patent literature (for example to the document DE 10 2015 203 644 A1 cited in the introduction). The press hardening can be effected both in what is known as a direct process and in what is known as an indirect process. The shaped sheet-metal part is formed from a sheet-steel material (for example 22MnB5 or 34MnB5) that is suitable for press hardening.

The second region has higher strength than the first region. In the second region, the shaped sheet-metal part has a strength (this being understood here and in the following text to mean the tensile strength), obtained by press hardening, of preferably at least 1000 MPa, in particular at least 1300 MPa. The first region of the shaped sheet-metal part is unhardened or is hardened only to a small extent and therefore has a lower strength than the second region, it being the case, however, that the ductility can be higher in the first region than in the (press-hardened) second region. "Unhardened" is to be understood in particular to mean that the first region has a strength which corresponds substantially to the initial strength of the sheet-steel material. "Hardened to a small extent" is to be understood in particular to mean that the first region has a strength which is higher than the initial strength of the sheet-steel material and lower than the strength, obtained during press hardening, in the second region, this possibly being achieved by virtue of suitable measures during the production of the shaped sheet-metal part, to which end reference is made to corresponding specialist and patent literature. In the first region, the shaped sheet-metal part preferably has a strength of 300 MPa to 800 MPa.

The transition region provided according to the invention is located between the first region and the second region, with the result that these two actually neighboring regions do not directly adjoin one another, but rather are connected to one another by way of the transition region, as it were, preferably without further intermediate regions or the like, in particular in such a way that the first region directly adjoins the sheet thickness transition zone of the transition region and the second region directly adjoins the strength transition zone of the transition region.

A transition region formed according to the invention avoids unfavorable jumps in strength and sheet thickness between the first and the second region. By contrast to the press-hardened shaped sheet-metal part previously known from DE 10 2015 203 644 A1, the transition region of the shaped sheet-metal part according to the invention is subdivided into multiple zones in such a way as to form a sheet thickness transition zone, an intermediate zone and a strength transition zone. On the one hand, the subdivision according to the invention of the transition region into multiple zones makes it possible to be able to better set the deformation behavior, specifically the bending behavior, in particular taking into account the intended use and the geometric connection conditions of the shaped sheet-metal part. On the other hand, the subdivision according to the invention of the transition region into multiple zones favors distribution of the loading over multiple zones and an associated equalization of stress peaks in the event of loading, in particular in the event of a crash. Improved loading and deformation properties and in particular also improved crash behavior are therefore obtained.

According to the invention, the transition region between the first region and the second region therefore has multiple zones, preferably three zones, in particular as described below.

Proceeding from the first region in the direction of the second region, first of all a sheet thickness transition zone (first zone) is provided, within which a sheet thickness transition from the sheet thickness of the first region to the sheet thickness of the second region is formed. The sheet thickness transition zone is a coherent section, as it were, within which the sheet thickness transition takes place. That is to say, the sheet thickness transition reaches or extends neither into the adjoining first region nor into the adjoining intermediate zone. The sheet thickness transition preferably extends over the entire sheet thickness transition zone or at least over the entire width of the sheet thickness transition zone. A continuous sheet thickness transition is preferably provided. The sheet thickness transition zone is preferably formed with an at least substantially homogeneous or uniform strength (specifically the strength of the first region). A gradual, that is to say progressive, sheet thickness transition is preferably provided in the sheet thickness transition zone.

An intermediate zone (second zone) follows the sheet thickness transition zone. Within this intermediate zone, the sheet thickness (specifically the sheet thickness of the second region) and the strength (specifically the strength of the first region) is preferably at least substantially homogeneous or uniform. In other words, the intermediate zone of the transition region preferably has a strength, in particular homogeneous strength, corresponding to the first region, and a sheet thickness, in particular homogeneous sheet thickness, corresponding to the second region. The intermediate zone is a coherent section, as it were, without a sheet thickness transition or strength transition.

It is especially favorably possible, that is to say not appreciably disadvantageous, to arrange a hole or a bore in the intermediate zone. It is therefore preferably provided that at least one hole or at least one bore, in particular with an embossed edge contour, is arranged within the intermediate zone. This hole or bore is for example a fastening hole (fastening bore) and/or a receiving hole (receiving bore) used for the production.

A strength transition zone (third zone), within which is formed a strength transition from the strength of the first region to the strength of the second region, follows the intermediate zone. The strength transition zone is a coherent section, as it were, within which the strength transition takes place. That is to say, the strength transition reaches or extends neither into the adjoining second region nor into the adjoining intermediate zone. The strength transition preferably extends over the entire strength transition zone or at least over the entire width of the strength transition zone. A continuous strength transition is preferably provided. The strength transition zone is preferably formed with an at least substantially homogeneous or uniform sheet thickness (specifically the sheet thickness of the second region). A gradual, that is to say progressive, strength transition is preferably provided in the strength transition zone.

In the case of the shaped sheet-metal part according to the invention, the sheet thickness transition and the strength transition are not placed one into the other or placed one on top of the other. The intermediate zone ensures, inter alia, that the sheet thickness transition zone and the strength transition zone do not intersect or overlap. The ductility of the intermediate zone is preferably higher than the ductility of the (press-hardened) second region, with the result that, in the event of a crash, the intermediate zone forms an additional deformation zone, which on account of the higher sheet thickness can potentially absorb more deformation energy than the sheet thickness transition zone and/or than the first region.

The shaped sheet-metal part according to the invention has at least one or at least one such transition region (comprising a sheet thickness transition zone, an intermediate zone and a strength transition zone). The shaped sheet-metal part according to the invention may however also have multiple such transition regions (that is to say, having a similar form to the preceding explanations) which are respectively arranged or formed between corresponding regions with different strengths and sheet thicknesses.

The press-hardened shaped sheet-metal part according to the invention is preferably produced or manufactured from one, that is to say from a single, tailored rolled blank (TRB). That is to say, given a one-piece form without a weld seam, the sheet-steel blank used for the production has blank regions which correspond to the regions of the shaped sheet-metal part and have different sheet thicknesses, which are created by rollers.

The sheet thickness transition zone, the intermediate zone and the strength transition zone of the transition region are preferably in the form of strip-like or band-like zones (bands) which extend between the first region and the second region, in particular directly next to one another. These strip-like zones preferably have a respective width (strip width) of between 35 mm and 60 mm, in particular between 40 mm and 50 mm. The width or strip width can vary (within the value ranges specified) over the longitudinal extent of the strip. The strip-like zones may be formed with a width which is substantially the same (for example +/−5 mm). The transition region may have a width or overall width (across all three zones) of between 100 mm and 200 mm, preferably between 110 mm and 150 mm, in particular between 120 mm and 140 mm (measured from the first region to the second region). This means that the above-mentioned effects (that is to say the advantages and improvements described) have an optimum impact, although the transition region and its zones ought not to be too narrow but also not to be too wide, in particular not narrower and/or wider than the values specified.

The sheet thickness in the sheet thickness transition zone preferably decreases or increases continuously or at least substantially continuously, this being understood to mean in particular a constant gradient or ramp gradient, the gradient or ramp gradient preferably extending over the entire width of the sheet thickness transition zone (see also FIG. 3 of the drawing). The decrease or increase in the sheet thickness preferably amounts to 0.05 mm to 0.2 mm per 10 mm of transition zone (in the direction of the second zone) and in particular approx. 0.1 mm per 10 mm of transition zone (in the direction of the second zone). The width of the sheet thickness transition zone may thus be set by specifying a certain decrease or increase in the sheet thickness, in particular already during the rolling of a tailored rolled blank.

The second region preferably has a larger sheet thickness than the first region. The first region may have a sheet thickness of between 1.2 mm and 2.1 mm and the second region may have a sheet thickness of between 2.3 mm and 2.9 mm, this involving in particular homogeneous or at least substantially homogeneous sheet thicknesses.

The press-hardened shaped sheet-metal part according to the invention may be blank (in the sense of uncoated) or else have a coating on one side or on both sides, in particular a metallic corrosion-protection coating. The coating may even be applied to the sheet-steel blank or to the starting sheet-metal material, or may be applied only after the press hardening.

The press-hardened shaped sheet-metal part according to the invention is preferably a chassis component or bodyshell component, in particular a structural component, for a motor vehicle. The shaped sheet-metal part according to the invention is in the form, for example, of a longitudinal member element, crossmember element, end wall element, tunnel reinforcing element, cowl element, roof frame element, side sill element, side impact element or the like.

The press-hardened shaped sheet-metal part according to the invention is in particular a pillar reinforcement for a motor vehicle bodyshell, preferably for a B pillar (B pillar reinforcement), alternatively also for an A pillar, C pillar or D pillar, having an unhardened base region or a base region which is hardened only to a small extent (first region) and a press-hardened center region (second region), the center region having a larger or smaller sheet thickness, in particular a larger sheet thickness, than the base region. A transition region, which, starting from the base region (in the direction of the center region), has or comprises a sheet thickness transition zone, an intermediate zone and a strength transition zone, is formed between the base region and the center region, in a similar way to the preceding explanations.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
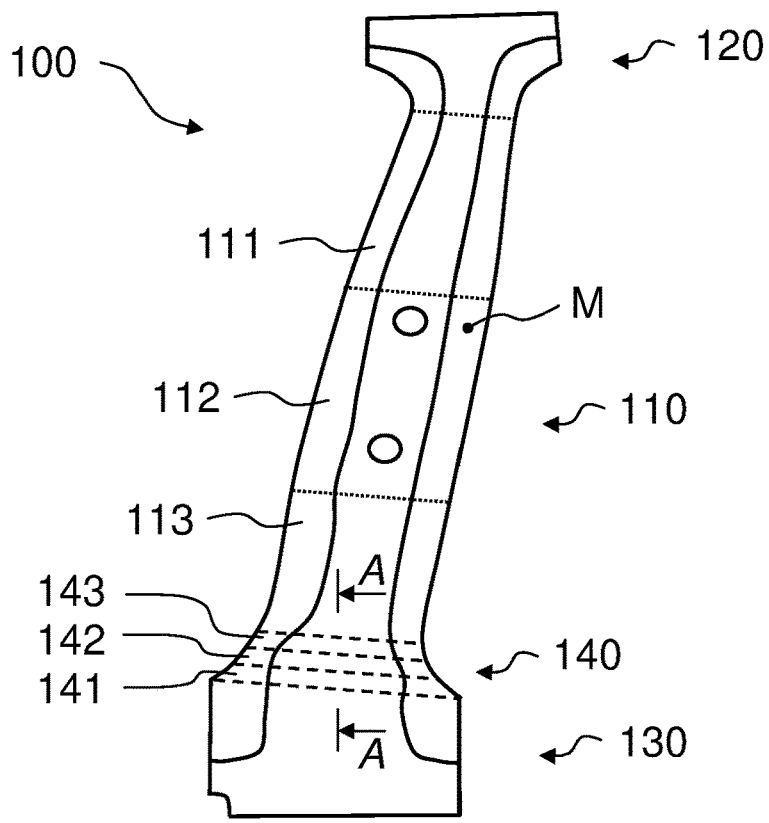
FIG. 1 is a plan view of a pillar reinforcement for a passenger motor vehicle bodyshell.

FIG. 1 shows a pillar reinforcement 100 for a B pillar. The pillar reinforcement 100 has a base region (base portion) 130 for connection to a side sill, a top region (top portion) 120 for connection to a roof frame, and a center region 110. The pillar reinforcement 100 is in the form of a press-hardened shaped sheet-metal part and has regions with different sheet thicknesses and different strengths, which achieves a weight-optimized configuration which is appropriate for the loading. The pillar reinforcement 100 is produced from a single tailored rolled blank (without a weld seam).

In the exemplary embodiment shown, the pillar reinforcement 100 has a press-hardened center region 110, in which the sheet-steel material M has a strength, obtained by press hardening, of for example at least 1000 MPa, preferably at least 1300 MPa. The center region 110 may be formed with a homogeneous sheet thickness or may have multiple substantially identically strong partial regions 111, 112, 113 (that is to say partial regions formed with the same strength) with different sheet thicknesses. The press-hardened center region 110 has a sheet thickness of for example 2.5 mm at least in the lowermost partial region 113, or the partial region facing the base region 130. In the base region 130, the sheet-steel material M is hardened only to a small extent or is unhardened and has for example a strength of 300 MPa to 800 MPa. In the base region 130, the sheet thickness amounts to for example 2.0 mm. In the top region 120, the sheet-steel material M is likewise press hardened and has a strength of for example at least 1000 MPa, it also being possible to provide that the sheet-steel material M in the top region 120 (in a similar way to in the base region 130) is hardened only to a small extent or is unhardened. The sheet thickness in the top region 120 may correspond to the sheet thickness of the base region 130 or to a sheet thickness of the center region 110.

The pillar reinforcement 100 therefore has a comparatively thick and strong form in the center region 110 so as to meet the particularly high strength and stiffness requirements (for example owing to passenger protection and owing to the attachment of door hinges and door locks). By contrast, the pillar reinforcement 100 in the base region 130, which is provided for the attachment of the pillar reinforcement 100 to a side sill or the like, has a comparatively thin and soft or ductile form, in order to allow targeted deformation (for example buckling) and to prevent tears and brittle fracture in the event of a crash. In other words: The center region 110 or its lowermost partial region 113 has a stronger and thicker form than the base region 130, and the base region 130 has a thinner and softer or more ductile form than the center region 110 or its lowermost partial region 113.

A transition region 140, which, starting from the base region 130 (first region) in the direction of the center region 110 (second region) or its lowermost partial region 113, has a sheet thickness transition zone 141 facing the base region 130, an intermediate zone 142, and a strength transition zone 143 facing the center region 110, is formed between the base region 130 and the center region 110. With respect to the installation position, shown in FIG. 1, of the pillar reinforcement 100, the strength transition zone 143 is located above the sheet thickness transition zone 141, or the sheet thickness transition zone 141 is located below the strength transition zone 143. The sheet thickness transition zone 141 and the strength transition zone 143 are spaced apart from one another by the intermediate zone 142, it being possible for the spacing to preferably correspond to the width (see below) of the sheet thickness transition zone 141 and/or the width of the strength transition zone 143, in particular +/−5 mm. At least one hole or bore may be arranged within the intermediate zone 142 (not shown).

The zones 141, 142, 143 of the transition region 140 have a strip-like or band-like form with respect to the plan view (or side view) shown in FIG. 1, and extend directly next to one another from an outer edge of the pillar reinforcement 100 to the oppositely situated outer edge. The strip-like zones 141, 142, 143 may have a respective width B1, B2, B3 (the strip width being understood to mean transversely to the strip longitudinal extent; see FIG. 2) of between 35 mm and 60 mm, preferably between 40 mm and 50 mm. The strip-like zones 141, 142, 143 may have an at least approximately constant or else a variable width B1, B2, B3.

Figure 2:
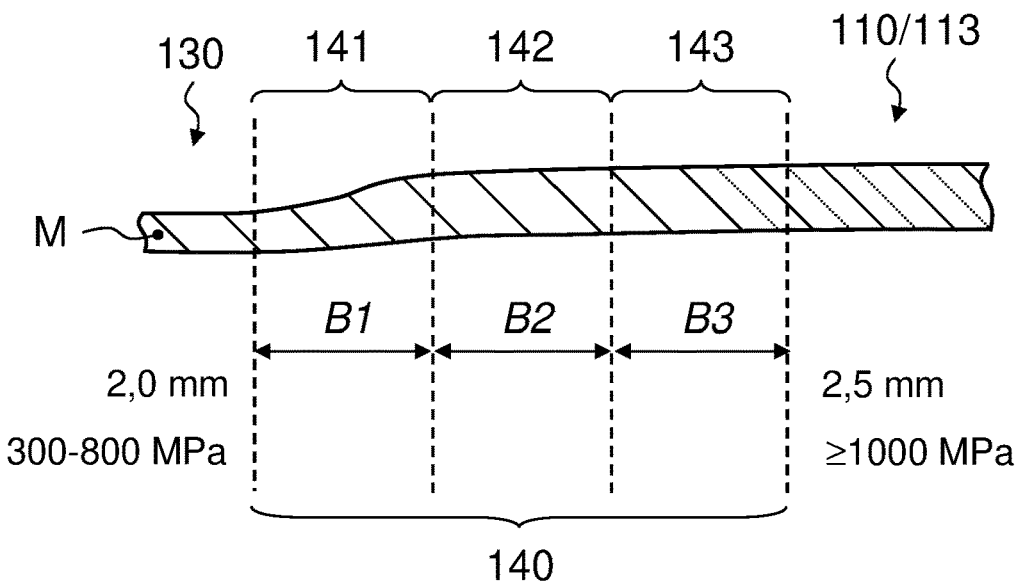
FIG. 2 is an enlarged sectional illustration of the transition region between the base region and the center region on the pillar reinforcement of FIG. 1, in accordance with the sectional lines A-A specified in FIG. 1.

FIG. 2 illustrates a schematic sectional illustration (not true to scale) of the transition region 140. In the sheet thickness transition zone 141 (first zone), along with a uniform or homogeneous strength (300 MPa to 800 MPa) there is a gradual (that is to say a step-free or jump-free) sheet thickness transition or increase in the sheet thickness from the sheet thickness of the base region 130 (2.0 mm) to the sheet thickness of the center region 110 or the lowermost partial region 113 of the center region 110 (2.5 mm). The gradual sheet thickness transition is therefore smooth, as it were. (The sheet thickness transition profile shown is merely exemplary and serves for illustration purposes.) Within the intermediate zone 142 (second zone), the sheet thickness and the strength are uniform or homogeneous. That is to say, the intermediate zone 142 has the sheet thickness (2.5 mm)

of the center region 110 or its lowermost partial region 113 and the strength (300 MPa to 800 MPa) of the base region 130. In the strength transition zone 143 (third zone), along with a uniform or homogeneous sheet thickness (2.5 mm), there is a gradual (that is to say a step-free or jump-free) strength transition or increase in the strength from the strength of the base region 130 (300 MPa to 800 MPa) to the strength of the center region 110 or the lowermost partial region 113 of the center region 110 (greater than/equal to 1000 MPa). The gradual strength transition therefore has a thick form, as it were.

As was already mentioned above, the shaped sheet-metal part 100 can be produced both in a direct process and in an indirect process. In the direct process, the sheet-steel blank, in particular a tailored rolled blank, used for the production undergoes austenitization, in particular undergoes complete austenitization, by heating, and then is formed in a press-hardening tool 200 and cooled. In the indirect process, before the austenitization, first of all the sheet-steel blank is formed.

Figure 3:
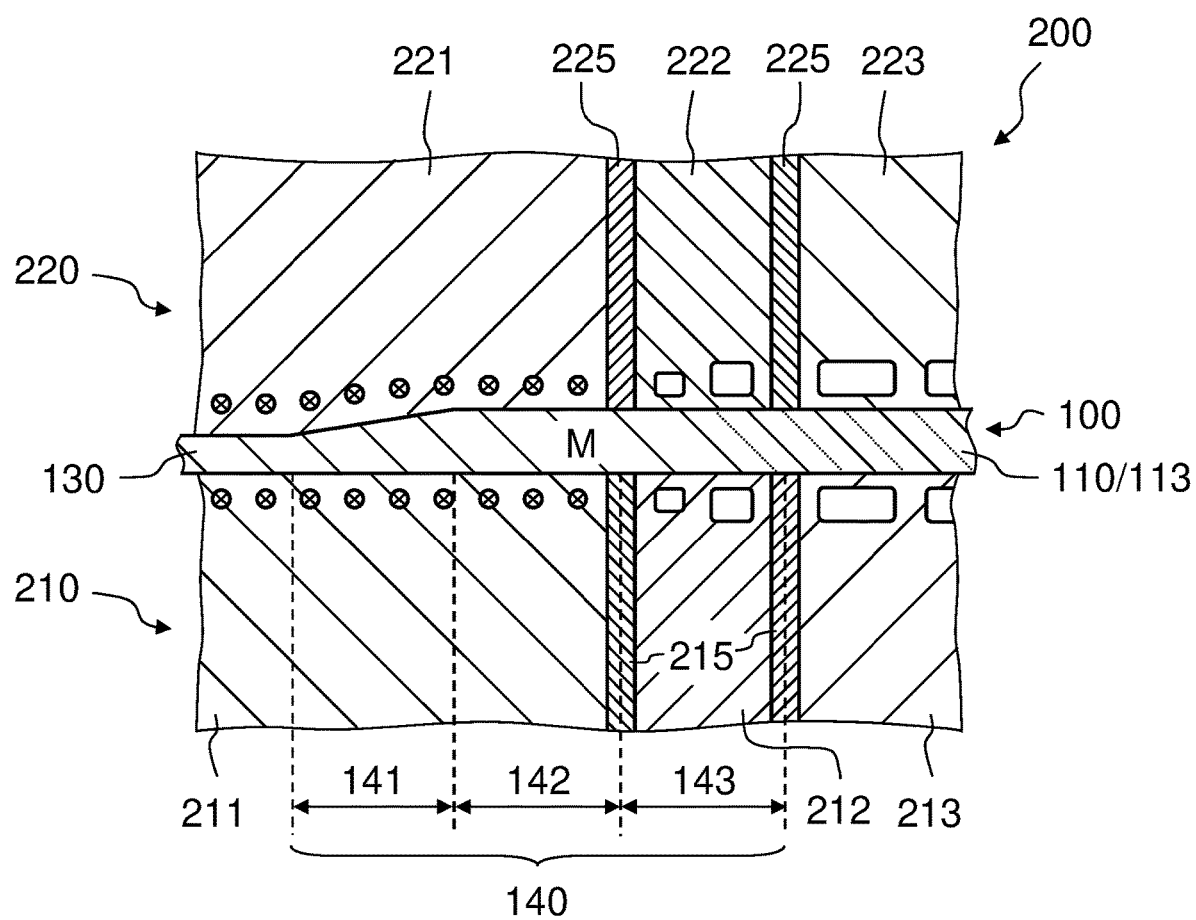
FIG. 3 shows a possible way of creating a transition region according to an embodiment of the invention.

FIG. 3 illustrates a schematic sectional illustration (not true to scale) of one way of creating a transition region 140. As a departure from the possible embodiment shown in FIG. 2, the sheet thickness transition profile in the sheet thickness transition zone 141 has a substantially constant gradient or ramp gradient. The press-hardening tool 200, which is illustrated only as a detail in FIG. 3, comprises a tool lower part 210 and a tool upper part 220. Both the tool lower part 210 and the tool upper part 220 have a segmented form and respectively have a first segment 211, 221, a second segment 212, 222, and a third segment 213, 223. Insulating means 215, 225 are located between the adjacent segments. The first segments 211, 221 are formed with heating devices, in particular with electrical heating devices. The second segments 212, 222 and the third segments 213, 223 are formed with cooling devices, in particular with water cooling devices.

The cooled third segments 213, 223 bring about quick cooling of the previously austenitized sheet-steel material M, with the result that press hardening takes place in the second component region 110 or in the partial region 113. The heated first segments 211, 221 prevent such quick cooling, with the result that the sheet-steel material M in the first component region or in the base region 130 and also in the sheet thickness transition zone 141 and in the intermediate zone 142 of the transition region 140 is hardened only to a small extent or remains unhardened. The likewise cooled second segments 212, 222 have a specific temperature profile or temperature gradient (the cooling devices have an appropriate form, it being possible to alternatively or additionally also provide heating devices) and make it possible to form the strength transition in the strength transition zone 143 of the transition region 140 in a defined manner. Suitable configurations and settings for the press-hardening tool 200 can be determined by simulation and/or tests. A press-hardened shaped sheet-metal part 100 according to the invention may also be produced in other ways.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

100 Pillar reinforcement (shaped sheet-metal part)
110 Center region (second region)
111 Partial region
112 Partial region
113 Partial region
120 Top region
130 Base region (first region)
140 Transition region
141 Sheet thickness transition zone (first zone)
142 Intermediate zone (second zone)
143 Strength transition zone (third zone)
200 Press-hardening tool
210 Tool lower part (first tool part)
211 First segment
212 Second segment
213 Third segment
215 Insulating means
220 Tool upper part (second tool part)
221 First segment
222 Second segment
223 Third segment
225 Insulating means
B1 Width
B2 Width
B3 Width
M Sheet-steel material

What is claimed is:

1. A press-hardened shaped sheet-metal part, which has different sheet thicknesses and strengths, comprising:
   an unhardened first region, or a first region which is hardened only to a small extent;
   a press-hardened second region, wherein the second region has a larger or smaller sheet thickness than the first region and has a higher strength than the first region; and
   a transition region formed between the first region and the second region, wherein the transition region, starting from the first region, has a sheet thickness transition zone, an intermediate zone, and a strength transition zone.

2. The shaped sheet-metal part according to claim 1, wherein
   the intermediate zone of the transition region has a strength corresponding to the first region and a sheet thickness corresponding to the second region.

3. The shaped sheet-metal part according to claim 1, wherein
   at least one bore is arranged within the intermediate zone.

4. The shaped sheet-metal part according to claim 1, wherein
   the part is produced from a tailored rolled blank.

5. The shaped sheet-metal part according to claim 1, wherein
   the sheet thickness transition in the sheet thickness transition zone has a gradual form along with a homogeneous strength.

6. The shaped sheet-metal part according to claim 5, wherein
   the strength transition in the strength transition zone has a gradual form along with a homogeneous sheet thickness.

7. The shaped sheet-metal part according to claim 1, wherein
   the strength transition in the strength transition zone has a gradual form along with a homogeneous sheet thickness.

8. The shaped sheet-metal part according to claim 1, wherein the sheet thickness transition zone, the intermediate zone, and the strength transition zone are in the form of strip-shaped zones.

9. The shaped sheet-metal part according to claim 8, wherein
the strip-shaped zones have a respective width of 35 mm to 60 mm.

10. The shaped sheet-metal part according to claim 1, wherein
the first region has a sheet thickness of between 1.2 mm and 2.1 mm and the second region has a sheet thickness of between 2.3 mm and 2.9 mm.

11. A pillar reinforcement, comprising:
a press-hardened shaped sheet-metal part of a motor vehicle bodyshell, wherein the part is for a B pillar of the motor vehicle, and has different sheet thicknesses and strengths,
wherein the part comprises an unhardened base region, or a base region which is hardened only to a small extent, a press-hardened center region, wherein the center region has a larger or smaller sheet thickness than the base region and has a higher strength than the base region, and a transition region between the base region and the center region, which, starting from the base region, has a sheet thickness transition zone, an intermediate zone, and a strength transition zone.

12. The pillar reinforcement according to claim 11, wherein
the intermediate zone of the transition region has a strength corresponding to the base region and a sheet thickness corresponding to the center region.

* * * * *